W. T. Miller,
Mower.
No. 108,716.                              Patented Oct. 25, 1870.
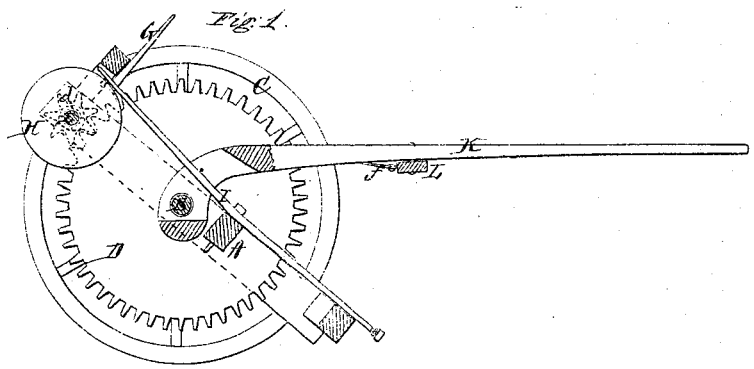
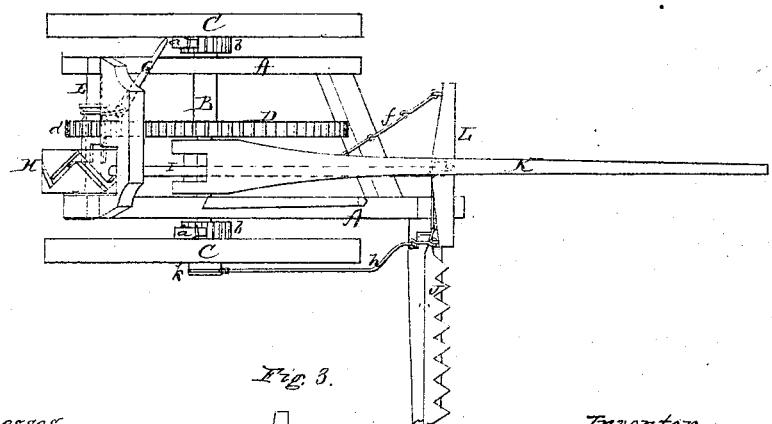
Witnesses.
Harry King
C. L. Curt
Inventor:
William T. Miller
per
Alexander Mason
Attys.

UNITED STATES PATENT OFFICE.

WILLIAM THOMAS MILLER, OF NEW GENEVA, PENNSYLVANIA.

IMPROVEMENT IN HARVESTERS.

Specification forming part of Letters Patent No. 108,716, dated October 25, 1870.

*To all whom it may concern:*

Be it known that I, WILLIAM THOMAS MILLER, of New Geneva, in the county of Fayette, and in the State of Pennsylvania, have invented certain new and useful Improvements in Harvesters; and do hereby declare that the following is a full, clear, and exact description thereof, reference being had to the accompanying drawing, and to the letters of reference marked thereon, making a part of this specification.

The nature of my invention consists in the construction and arrangement of a harvester, as will be hereinafter fully set forth.

In order to enable others skilled in the art to which my invention appertains to make and use the same, I will now proceed to describe its construction and operation, referring to the annexed drawing, in which—

Figure 1 is a longitudinal vertical section, and Fig. 2 is a plan view, of my machine. Fig. 3 is a view of the double-tree.

A represents the frame of my machine. B is the axle supporting said frame, having on its ends the wheels C C. To the inner side of the hub of each of the wheels is attached a spring-pawl, $a$, which gears with a toothed pinion, $b$, on the axle, so that when both or either of the wheels move forward, the axle will revolve with the wheels; but either wheel may turn backward on the axle independent of the other.

On the axle B, within the frame A, is attached a cog-wheel, D, which gears with a pinion, $d$, placed loosely upon a shaft, E, at the rear end of the frame A.

The pinion $d$ is moved longitudinally on the shaft E by means of the lever G, and on one side of said pinion are projections, as shown in Fig. 2, which enter into recesses on the side of a wheel or roller, H, secured on the shaft E. When in this position the pinion gears with the cog-wheel D, so that the roller H and shaft E revolve; but when the pinion is moved by the lever G, so that its projections are out of the recesses in the roller, then the pinion revolves alone on the shaft.

The circumference of the roller H is provided with a zigzag groove, $e$, in which is inserted a pin at the rear end of a lever, I, pivoted in any suitable manner within the frame A, the front end of said lever being connected with the cutter-bar J.

When the roller H revolves, the pin in the rear end of the pivoted lever I follows the zigzag groove $e$, causing the lever to vibrate from side to side and operate the cutter-bar.

K represents the tongue, the rear end of which is enlarged and placed between the cog-wheel D and the cutter-bar side of the frame A, the axle B passing through holes in the tongue, as shown in Fig. 1.

On the under side of the tongue K is a bolt, $i$, which passes through an elongated slot in the double or whiffle tree L.

The inner end of the whiffletree is, by a chain, $f$, connected with the tongue, while the outer end, or the end above the cutter-bar, is, by a rod, $h$, connected with the end of the axle on this side of the machine, the rear end of said rod being in the form of a loop placed in a groove around a collar or roller, $k$, on the axle, outside of the wheel. By this means the off horse, in place of applying his power where the tongue is connected with the axle, applies it on the outside of the drive-wheel next the cutter-bar, thus doing away with the side draft.

By the hole in the whiffletree, where the bolt $i$ passes through, being elongated, the horses, instead of pulling on it, pull on the stay $f$ and the center draft-bar, $h$.

In a machine without the center draft-bar, both horses apply their power at the same point, thus giving the off horse all of the side draft, while he also assists in pulling the other draft.

Having thus fully described my invention, what I claim as new, and desire to secure by Letters Patent, is—

The whiffletree L, provided with an elongated slot, in which the bolt $i$ works, and connected by means of the stay $f$ to the tongue K, and by the draft-bar $h$ to the axle, outside of the wheel nearest the cutter-bar, substantially as and for the purposes herein set forth.

In testimony that I claim the foregoing I have hereunto set my hand this 6th day of June, 1870.

WILLIAM T. MILLER.

Witnesses:
WM. H. DEFFENBAUGH,
H. T. JACO.